UNITED STATES PATENT OFFICE.

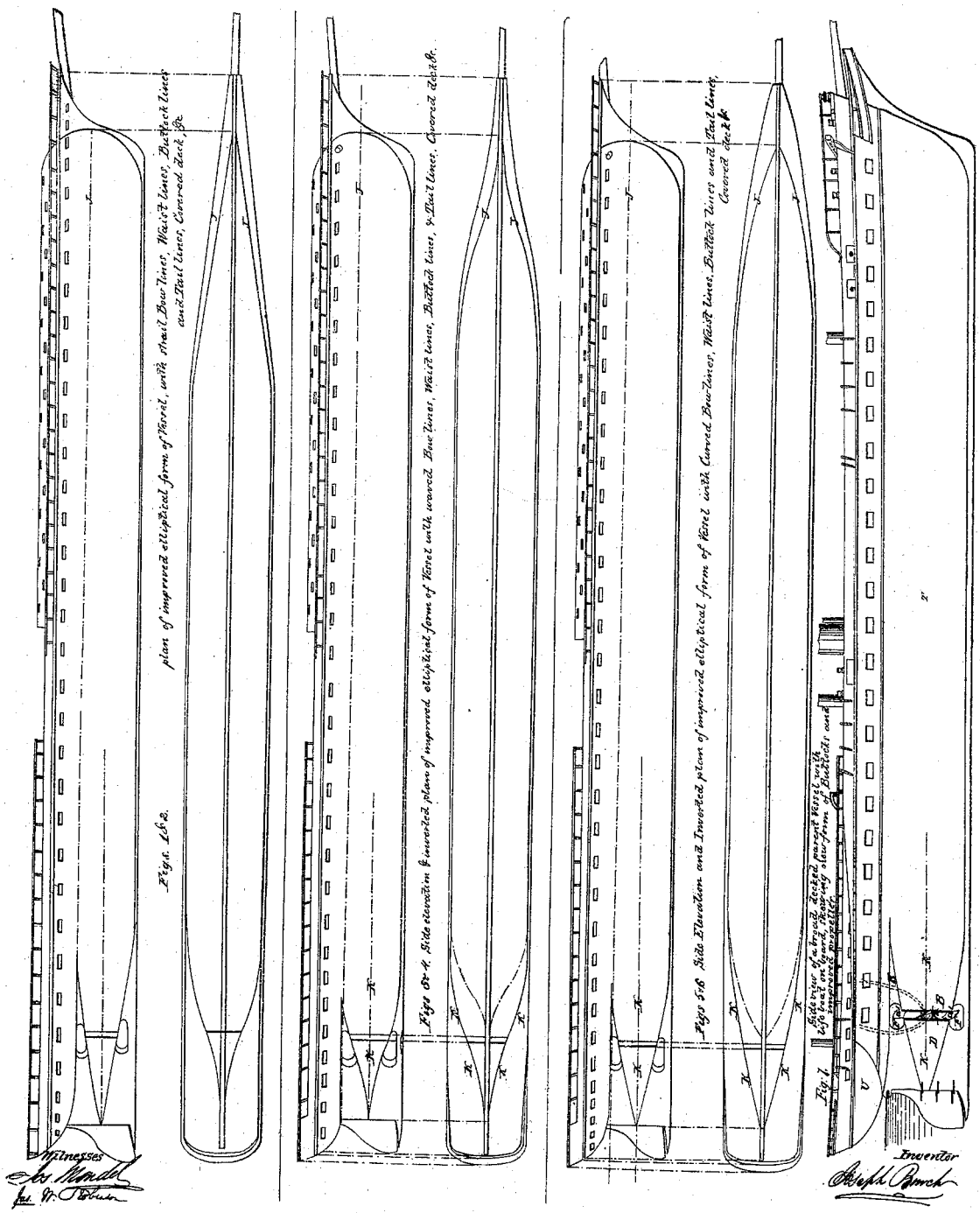

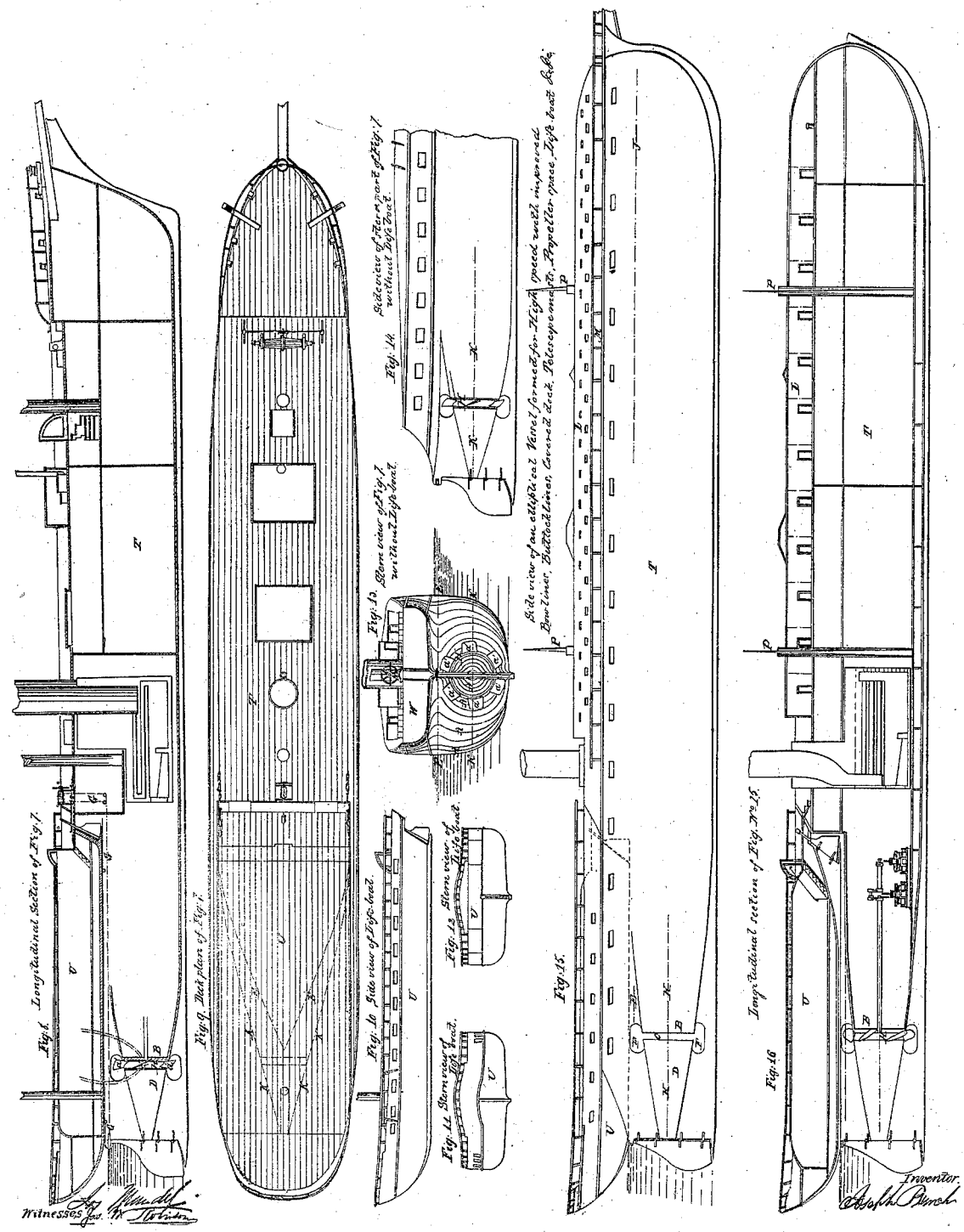

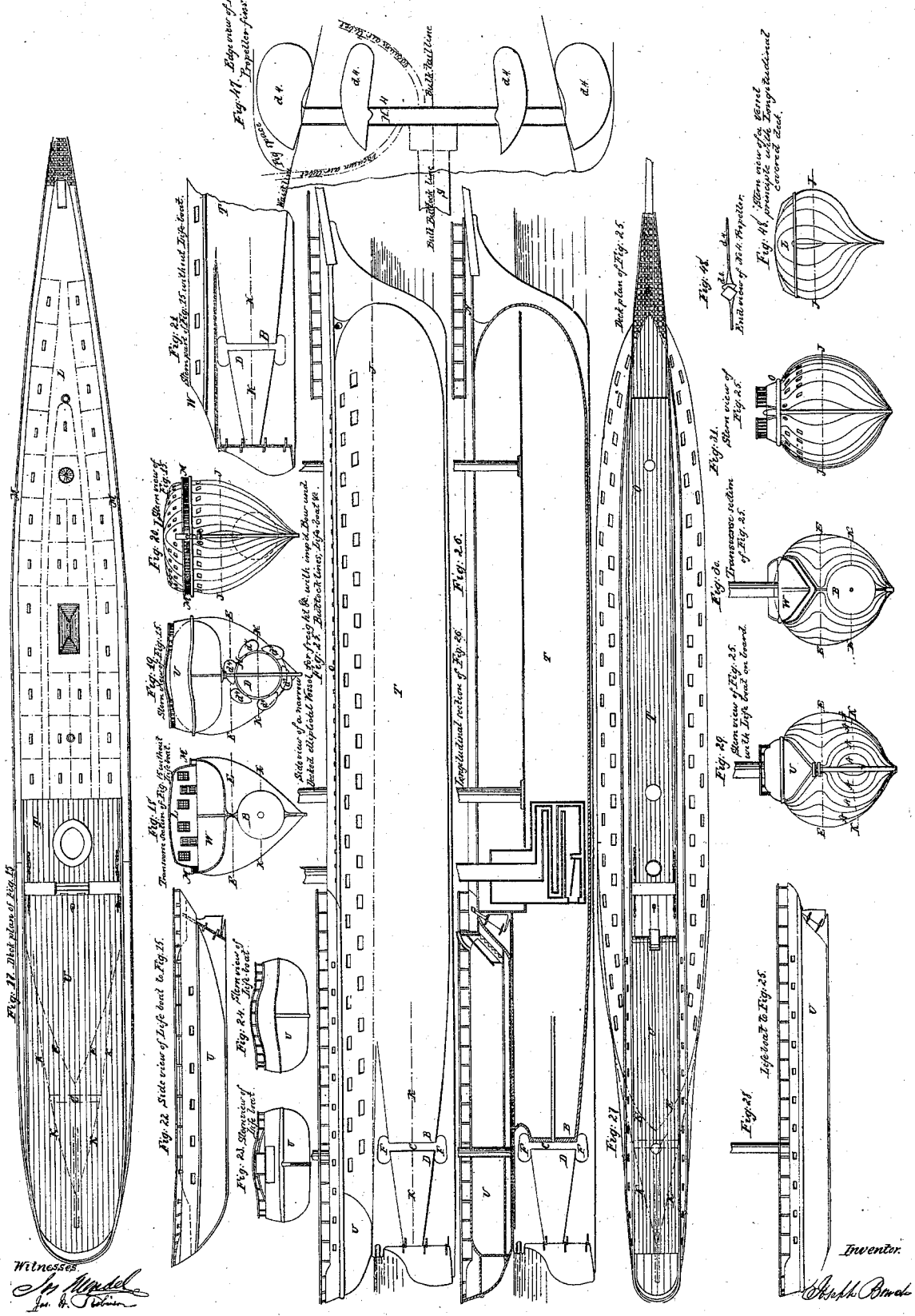

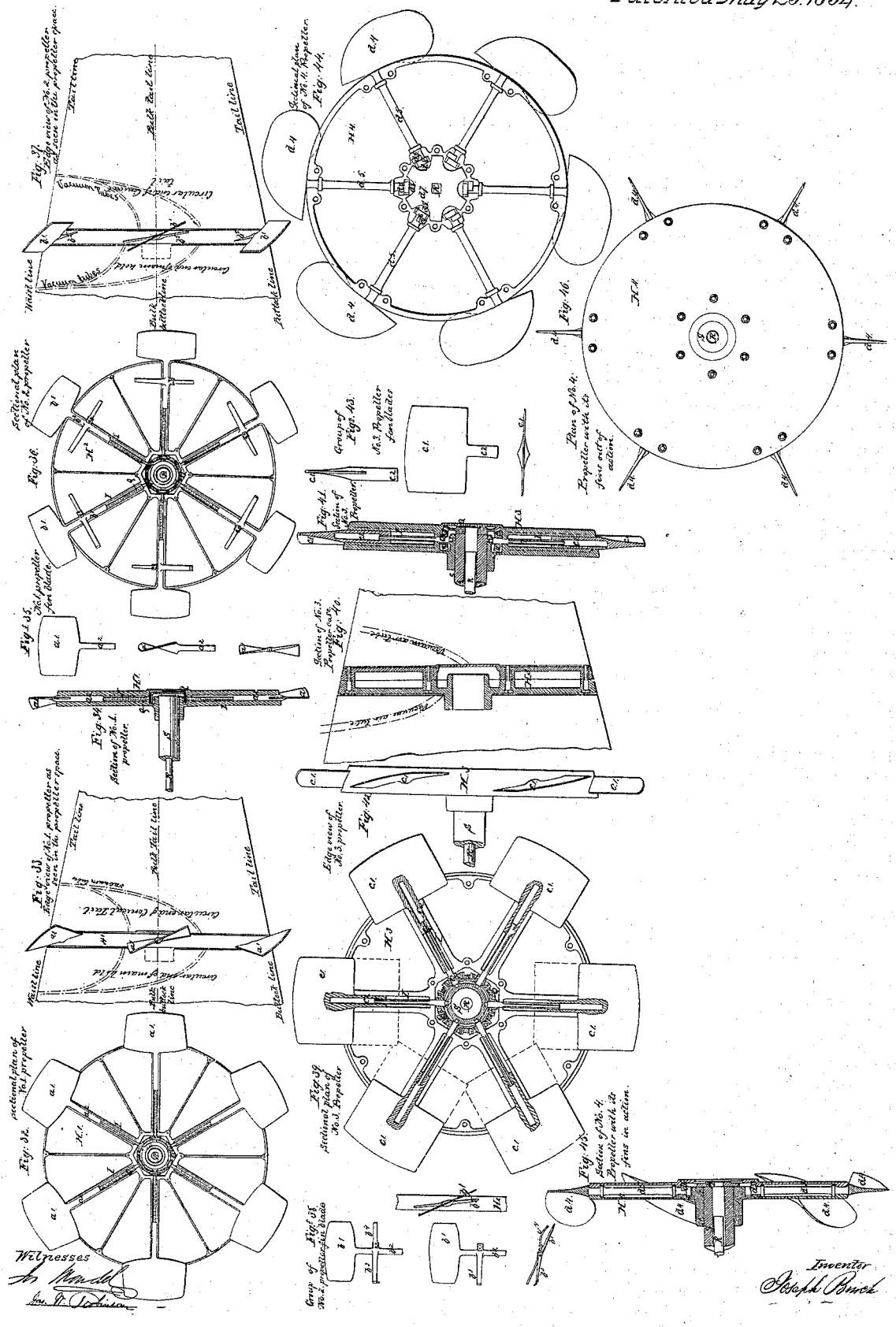

JOSEPH BURCH, OF NEAR MACCLESFIELD, COUNTY OF CHESTER, ENGLAND.

IMPROVEMENT IN CONSTRUCTING SHIPS FOR SAFETY AND ESCAPE.

Specification forming part of Letters Patent No. 10,945, dated May 23, 1854.

*To all whom it may concern:*

Be it known that I, JOSEPH BURCH, of Cragg Hall, near Macclesfield, in the county of Chester, Great Britain, have invented certain new and useful Improvements in Arranging and Constructing Vessels for Saving Lives and Property in Cases of Shipwreck or Fire at Sea, which vessels are also useful for other purposes; and I do hereby declare the following is a full and exact description thereof, reference being had to the accompanying drawings, and to the letters of reference marked thereon.

My invention consists in a mode of constructing vessels in two distinct parts, but having the appearance, when together, of one perfect vessel, the larger or parent part to be the great body of the ship containing the whole length of the keel-main and foremasts, hold space for machinery, stowage, fore-cabin, berths, &c. The lesser or escape part to contain berths, saloon, victualing-stores, treasury, &c., the escape part to have the form of and be a perfect vessel of itself. It is to carry the mizzen-mast and is to occupy the space of and be a substitute for the quarter and after decks of the parent vessel occupying the deck-space from the stern up to about the mainmast and down to or level about with the water-line, and so arranged and fixed upon the parent part of the vessel that in cases of shipwreck or fire it may without difficulty be launched off the stern of the parent ship. The stern and bows of the escape-vessel form the stern and counter of the parent vessel.

In order to make a secure berth for the escape-vessel while on board the parent vessel and also to protect it from the force of the waves the sides of the parent vessel are to be raised above the water-line up to about the gunwale, forming a kind of trough, which may terminate obliquely about the stern-post of the parent vessel, and in this trough it will be seen by reference to the drawings the escape boat or vessel is securely placed with her head reaching to or projecting over the stern-post of the parent vessel and always in a position ready to be launched. To facilitate the launching under circumstances where this is required while the parent vessel still floats, I propose that the hold of the parent vessel should have a water-tight bulk-head division astern, and that the compartment thus formed shall be provided with plugs or valves for the purpose when necessary of letting in water, and in the event of the parent vessel being wrecked or on fire and all hope of saving her appears lost, the plugs or valves are then to be opened, when the after part of the parent vessel will begin to fill and sink, and the escape part can then without difficulty, when loosened from her fastenings, float off the wreck. I do not propose by admitting water into the parent vessel to sink it entirely. I would only admit sufficient water to enable the escape part to float off, or sufficient in cases of fire to drown the flames, and to avoid the loss of the larger vessel, while a hope remained of saving her, I would recommend the employment of self-acting valves, which should close in sufficient time to prevent the vessel from sinking, for, after all, she might escape the threatened danger, the escape part could again be readjusted on her stern, the water pumped out, and the perfect ship reach her destination in safety. In respect of the fastenings by which the two vessels must be bound together I need not say these must be of the simplest kind, in order that a separation may be made within a few moments after the order to let go is given. At the same time strength is required, in order to keep the escape-vessel well secured in heavy stormy weather. Various modes may be adopted; but that which appears to me among the simplest and most effective is shown in the drawings. It consists of strong hook-bolt fastenings attached to each side of the stern of the escape-vessel, and corresponding fastenings fixed to the deck of the parent vessel, and by means of short-noosed cables with tightening-blocks and falls the two vessels may be securely held together. The same means may be adopted at the sides and multiplied to resist effectively any force they may have to contend against. The rising trough sides of the parent vessel will be exposed to and receive the pressure of the sea, and although the stem and bows of the escape-vessel will be exposed the stern and side lashings, in addition to her own weight, will probably be found sufficient to keep her down. Should she lift, however, the result will not be disastrous, for the water would immediately rush up the trough between her and the parent vessel and act as a water-buffer as she again settled in her place. Under all circumstances I recommend rope fastenings, and where they are placed I would have a small hatchet chained, so that in case of any entanglement of the ropes all the noosed cables might be simultaneously severed at a moment's signal. In cases of shipwreck from fire or striking on sunken rocks, such as the loss of the *Amazon* and *Birkenhead*, I do not hesitate to say that had those vessels been provided with this means of escape almost every person who then perished would have been saved, and during the late wreck of the *Queen Victoria* off the coast of Ireland its services would have been equally effective. The captains and crews of vessels having the means of escape at hand for themselves and passengers will lose neither energy nor presence of mind. There will be no scrambling into launching and swamping unseaworthy boats. Every effort will be made to save the parent vessel, which in some instances need not be abandoned until she even sinks away from the escape part. Of course there are circumstances in dreadful storms when no human aid or contrivance could rescue the doomed vessel and her unhappy living freight. The mercy of Providence alone can then save; but from such disasters at sea as fire, leakages, striking on sunken rocks, shoal waters, sand banks, collisions, and many other casualties by which so many vessels and lives have lately been sacrificed and so much valuable property lost, I venture to hope that this invention may prove under these circumstances a sure means of escape. It will also be found useful in the Arctic regions and likewise in exploring rivers where in shallow waters the parent vessel could not float.

The escape-vessel may be constructed to receive a small portable engine and boiler from the parent vessel, and thus be made available for many other useful purposes. Her style and form will entirely depend upon the description of the parent vessel she may be fitted to. I cannot lay down an abiding rule, but as a life-boat I would herein suggest various appliances for increasing her safety qualities. The bottom of the safety-vessel should be constructed of light sheet-iron frame-work forming air-tight compartments, and for further security these cells might be filled with thin air-tight vessels, so that if a compartment is damaged and becomes leaky the air-tight vessels within would still preserve the buoyancy of the escape-vessel. With such a provision it will be seen that she must be almost battered to pieces before she would entirely sink.

To insure perfect safety and protection in stormy weather, it will probably be found prudent to shorten the counter of the parent vessel by not allowing the head and bows of the escape-vessel to project beyond the sternpost.

The several drawings accompanying and making part of this specification fully represent the mode of construction which I prefer, with some modifications of form, the same letters indicating corresponding parts in the several figures.

Figure 7 is a side view of a broad-decked parent vessel with life-boat on board, showing new form of buttocks and improved propeller; Fig. 8, a longitudinal section of Fig. 7; Fig. 9, a deck plan of Fig. 7; Fig. 10, a side view of life-boat or escape-vessel; Fig. 11, a stem view of life-boat; Fig. 12, a stern view of life-boat; Fig. 13, a stern view of Fig. 7, showing the improvements below the waterline without life-boat; Fig. 14, a side view of stern part of Fig. 7; Fig. 15, a side view of an elliptical-formed vessel with improved bow and buttock lines, covered deck, telescope masts, and propeller-space; Fig. 16, a longitudinal section of Fig. 15; Fig. 17, a deck plan of Fig. 15; Fig. 18, a transverse section of Fig. 15; Fig. 19, a stern view of Fig. 15; Fig. 20, a stem view of Fig. 15; Fig. 21, a stern part of Fig. 15; Fig. 22, a side view of life-boat; Fig. 23, a stern view of life-boat; Fig. 24, a stem view of life-boat; Fig. 25, a side view of a narrow-decked elliptical-built vessel for freight with improved bow and buttock lines, lifeboat, &c.; Fig. 26, a longitudinal section of Fig. 25; Fig. 27, a deck plan of Fig. 25; Fig. 28, a life-boat to Fig. 25; Fig. 29, a stern view of Fig. 25, with life-boat on board; Fig. 30, a transverse section of Fig. 25; Fig. 31, a stem view of Fig. 25; and Fig. 48 a stem view of a vessel on the elliptical principle with covered deck, the transverse axis of the ellipses being placed longitudinal to obtain a greater breadth of beam.

In the accompanying drawings, T represents the main or parent vessel, with a trough W extending from the stern to within a short distance of the mainmast, and to this trough is fitted an escape or life vessel U, which is in itself a complete vessel, as hereinbefore specified.

The tiller ropes or chains G are represented as passing from the tiller forward of the lifevessel and below the bottom thereof to the rudder.

The stern of the main or parent vessel may be formed, as represented at K K and E E, with a space C and F for the reception of a propeller H and the passage of the paddles $a'$ $a'$, attached to the periphery of a wheel which turns in the space C, so that the paddles in their circuit act on the water surrounding the stern and pass through the openings F F in the dead-wood and keel.

The mode of constructing the parent vessel and the arrangement of the propeller adapted thereto I contemplate securing by a separate patent, the claim in this application being limited to the making of the parent vessel with a suitable receptacle for and in combination with the life-vessel fitted thereto, and which can be separated therefrom to constitute a separate vessel when it becomes necessary for safety.

Having now described the nature and advantages of my invention, and also a way in which it can be practiced or performed, I wish it to be understood that I do not confine myself to any exact form or dimensions for constructing any of the different parts, neither do I confine myself to the details herein described, so long as the peculiar character or principle of my invention be retained, nor do I claim any parts but those which are distinctly pointed out; but

What I claim as my invention, and desire to secure by Letters Patent, are the several improvements, as follows:

The mode of constructing vessels in two distinct parts, as herein called the "parent vessel" and the "escape-vessel," on the principle and manner and for such like purposes as are herein described.

JOSEPH BURCH.

Witnesses:
JOS. MONDEL,
JAS. W. ROBINSON.